(12) United States Patent
Galloway

(10) Patent No.: US 7,998,226 B2
(45) Date of Patent: Aug. 16, 2011

(54) APPLIANCE FOR CONVERTING HOUSEHOLD WASTE INTO ENERGY

(75) Inventor: Terry R. Galloway, Berkeley, CA (US)

(73) Assignee: Terry R. Galloway, Berkeley, CA (US)

( * ) Notice: Subject to any disclaimer, the term of this patent is extended or adjusted under 35 U.S.C. 154(b) by 911 days.

(21) Appl. No.: 11/592,093

(22) Filed: Nov. 2, 2006

(65) Prior Publication Data

US 2007/0099039 A1    May 3, 2007

Related U.S. Application Data

(60) Provisional application No. 60/732,053, filed on Nov. 2, 2005.

(51) Int. Cl.
*B01J 7/00* (2006.01)

(52) U.S. Cl. ......... 48/61; 48/127.9; 48/127.1; 48/85.1; 48/103; 48/105; 48/107; 48/118.5; 48/74; 585/240; 585/241; 585/242; 422/184.1; 422/129; 429/19; 429/20

(58) Field of Classification Search ........... 48/61, 127.1, 48/127.9

See application file for complete search history.

(56) References Cited

U.S. PATENT DOCUMENTS

| | | | | |
|---|---|---|---|---|
| 4,057,396 A | * | 11/1977 | Matovich | 422/202 |
| 5,851,246 A | * | 12/1998 | Bishop et al. | 48/122 |
| 2005/0247553 A1 | * | 11/2005 | Ichikawa et al. | 202/96 |
| 2007/0190643 A1 | * | 8/2007 | Noll | 435/290.3 |

* cited by examiner

*Primary Examiner* — Alexa D. Neckel
*Assistant Examiner* — Kaity V. Handal
(74) *Attorney, Agent, or Firm* — Richard A. Dannells; Manatt, Phelps & Phillips, LLP

(57) ABSTRACT

An appliance is provided having a waste receptor module and an energy generation module for converting household waste into energy. The receptor module has a rotary drum with an opening for receiving the household waste and a steam reforming means for converting the waste into synthesis gas. A swing arm is attached adjacent to the opening in the rotary drum and a sealing door is mounted on the swing arm for sealing the opening when the waste receptor module is in operation. An outer door is used to cover the sealing door. The steam reforming means includes a tube mounted within the rotary drum for receiving the volatilized organic waste and an internal heater for heating the organic waste to temperatures to convert the waste into the synthesis gas. The energy generation module has an inlet in fluid communication with the waste receptor module for receiving the synthesis gas and a fuel cell for converting the synthesis gas into electrical energy.

20 Claims, 7 Drawing Sheets

APPLIANCE FOR CONVERTING HOUSEHOLD WASTE INTO ENERGY

FIELD OF THE INVENTION

This application claims the benefit of U.S. Provisional Application No. 60/732,053 filed Nov. 2, 2005, incorporated by reference.

The invention relates to an appliance for the destruction of residential and building waste to form hydrogen-rich syngas to power a fuel cell for the generation of electric power, steam and heat or cooling for use in residences and buildings as well as hydrogen fuel for vehicles.

BACKGROUND OF THE INVENTION

Across the nation, and indeed the world, the energy content of this household waste is enormous; for example, for each person in the U.S. this municipal solid waste can be converted to produce roughly 6 kWh of electricity per person per day. This is really very significant, when one considers that the average person in the U.S. consumes about 7 kWh per person per day.

There have not been any new appliances for single family or small multiple family residents to convert their household waste into useful recyclables and/or energy. The closest appliance has been the garbage compactor. Typical suppliers of such appliances include G.E., DeLonghi, Kenmore, Sears, Honeywell, Beoan, KitchenAid, Whirlpool, and others. Compactors have not been successful since garbage pickup costs are not reduced significantly by reducing the volume of the garbage. The cost of pickup of one can is the same regardless of the volume of the residential garbage in the can. Also, there are many operational problems: special and hard-to-locate compactor bags, consumable carbon filters that have to be replaced in order to avoid serious odor problems, frequent jammed rams from bottles, cans, and bulky waste not placed in the center of the load that can jam the drawer, leaking bags from punctures from sharps within the garbage spilling out disgustingly odiferous bio-hazardous liquids, and the necessity to use the compactor regularly and to remove the bags to avoid rotting garbage left in the unit, and the like. Further, the compactor does not produce energy or heat; instead it consumes energy.

There is a need for a household appliance that can eliminate a major portion of household waste and convert the waste into useful recyclables and/or energy.

SUMMARY OF THE INVENTION

The present invention offers a new approach in which a substantial amount of residential waste can be eliminated in a small, compact appliance that has appearance of a washer/dryer stack found in households.

The appliance of the present invention comprises a waste receptor module having a rotary drum having an opening for receiving household wastes, and steam reforming means for converting at least a substantial amount of the household waste into synthesis gas and an energy generation module having an inlet that is connected to said waste receptor module for receiving the synthesis gas and a fuel cell for converting the synthesis gas into at least electrical energy. The appliance of the present invention has vent, electrical, gas, sewer, and water connections. The appliance cures the problems of garbage compactors by greatly reducing the mass of the garbage, producing sterilized recyclable glass and metals, eliminating garbage requiring landfills, and using the organic chemical fraction of the waste to produce electricity, steam and heat.

The waste receptor module carries out endothermic reactions of steam reforming and is heated with waste heat and electrical power. Alternatively, this module can be heated by a natural gas burner. The module includes a rotary drum, into which are placed bags of waste that can consist of normal garbage as well as toilet solid waste. Glass and metal are not melted in this drum and are recovered as completely sterilized at the end of the process cycle.

Household waste contained in common paper or plastic bags is thrown into the waste receptor module through a sealed door like a dryer. The door is closed and the "on" button is pushed, beginning the processing of the waste. The automatic cycle is about 90 minutes. All of the organic waste is converted to synthesis gas (hereafter called "syngas"). The sterilized glass and metal remaining in the drum are cooled and retrieved for curbside recycling pickup.

The waste inside the drum is tumbled slowly while it is heated from the hot cartridge heater/steam reformer (SR) in the center of the drum. This SR central cylinder is heated internally by induction heat or with natural gas by means of a matrix heater. The vapors from this heated waste are pulled through the outer perforated portions of the SR cartridge to a hotter interior, in which the vapor temperature is raised to about 900-1050° C. (1650-1900° F.) and reacted with the steam from the waste and the re-circulated syngas. The hot syngas leaving the SR cartridge is cooled by two tandem heat exchangers to 50-90° C. (120-190° F.) and is pulled through a gas cleaning bed and condenser from which the liquid water is dropped out and sent to drain or to non-potable landscape watering.

The energy generation module receives the syngas produced by the waste receptor module and a fuel cell within the energy generation module converts the syngas into electricity, steam and heat. Specifically, cleaned gas from waste conversion module is pulled into the suction side of a blower out of which is discharged the syngas under pressure to feed the anode side of the fuel cell. The anode side of the fuel cell converts the syngas to hot $CO_2$ and steam at about 650° C. (1200° F.), while producing electricity from the $H_2$ and CO in the syngas. A fraction of this hot $CO_2$ and steam passes into the SR cartridge for recycling through the drum of the waste conversion module and the balance of this fraction passes through a heat exchanger to recover heat at high temperature useful for producing domestic hot water. The cathode side of the fuel cell is fed a high volume of hot air that is heated in the heat exchanger from the hot syngas and passes into the fuel cell cathode where the oxygen is electrochemically reduced on the catalytically active fuel cell elements. Leaving the hot cathode is as high volume of hot nitrogen at around 400° C. (750° F.) which is available for raising steam, space heating or cooling, or other applications.

DETAILED DESCRIPTION OF THE PREFERRED EMBODIMENTS

Figure 1A:
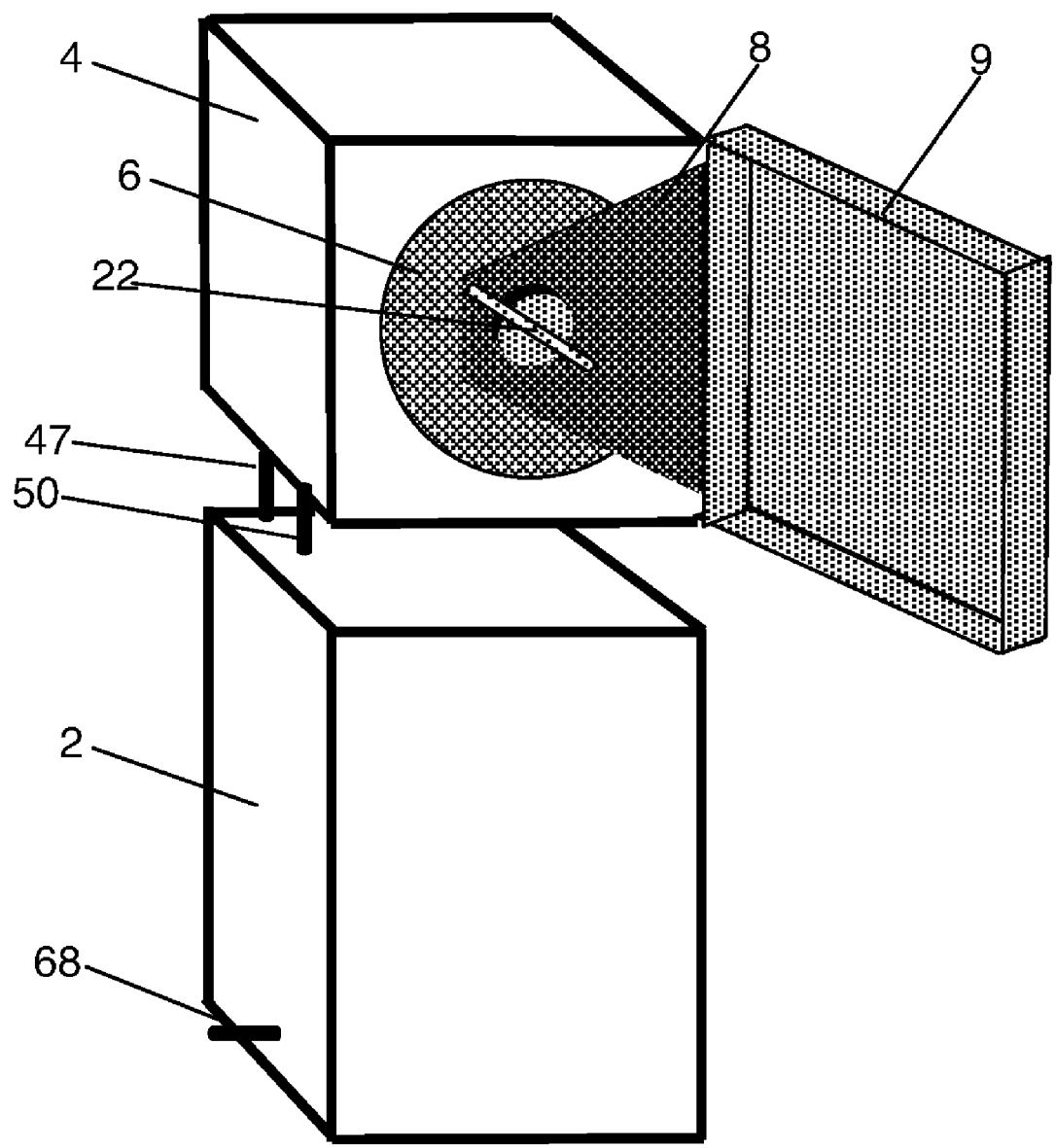
FIGS. 1A and 1B are conceptual drawings of two possible arrangements of the two modules of the residential household waste-to-energy appliance.

FIG. 1A shows an isometric view of the residential appliance in a stacked arrangement Waste Receptor Module a module on the top of module 4, which includes a waste processing system that steam reforms the waste into valuable syngas. Energy generation module uses the syngas to feed a fuel cell located therein for the production of electricity, steam and heat and optionally hydrogen and method also contains heat exchangers, blowers, valves, piping and controls that are described in reference to FIGS. 3 and 4.

Figure 1B:
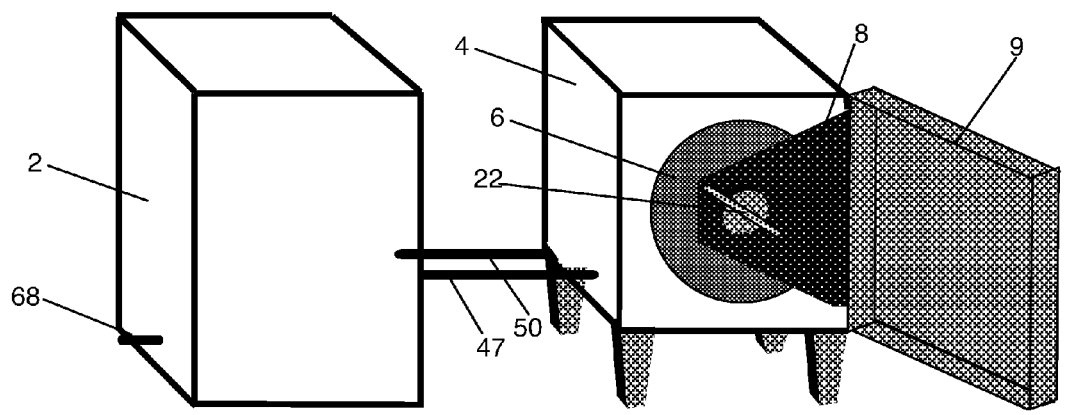

FIG. 1B shows an isometric view of another embodiment of the residential appliance of the present invention in a side-by-side, arrangement with the waste receptor module on the right.

Referring to FIGS. 1A and 1B, waste receptor module 4 consists of an assembly that includes a rotary drum for processing of the waste fitted with a sealing drum door 6 with a locking mechanism, pivot and swing arm 8 to permit the opening and closing of this drum door. There is also an outer door 9 that is closed to cover up the locking drum door handle that turns when the drum rotates as the processing of the waste is underway. The energy generation module 2 uses this syngas that feeds a fuel cell 60 located therein for the production of electricity, steam and heat and optionally hydrogen. Module 2 also contains heat exchangers, blowers, valves, piping and controls. The two modules are connected together by a pipe 47 that feeds the syngas produced from the waste receptor module 4 to the energy generation module 2. Pipe 50 returns unreacted syngas, steam, and carbon dioxide from the energy generation module 2 to the waste receptor module 4.

Figure 2A:
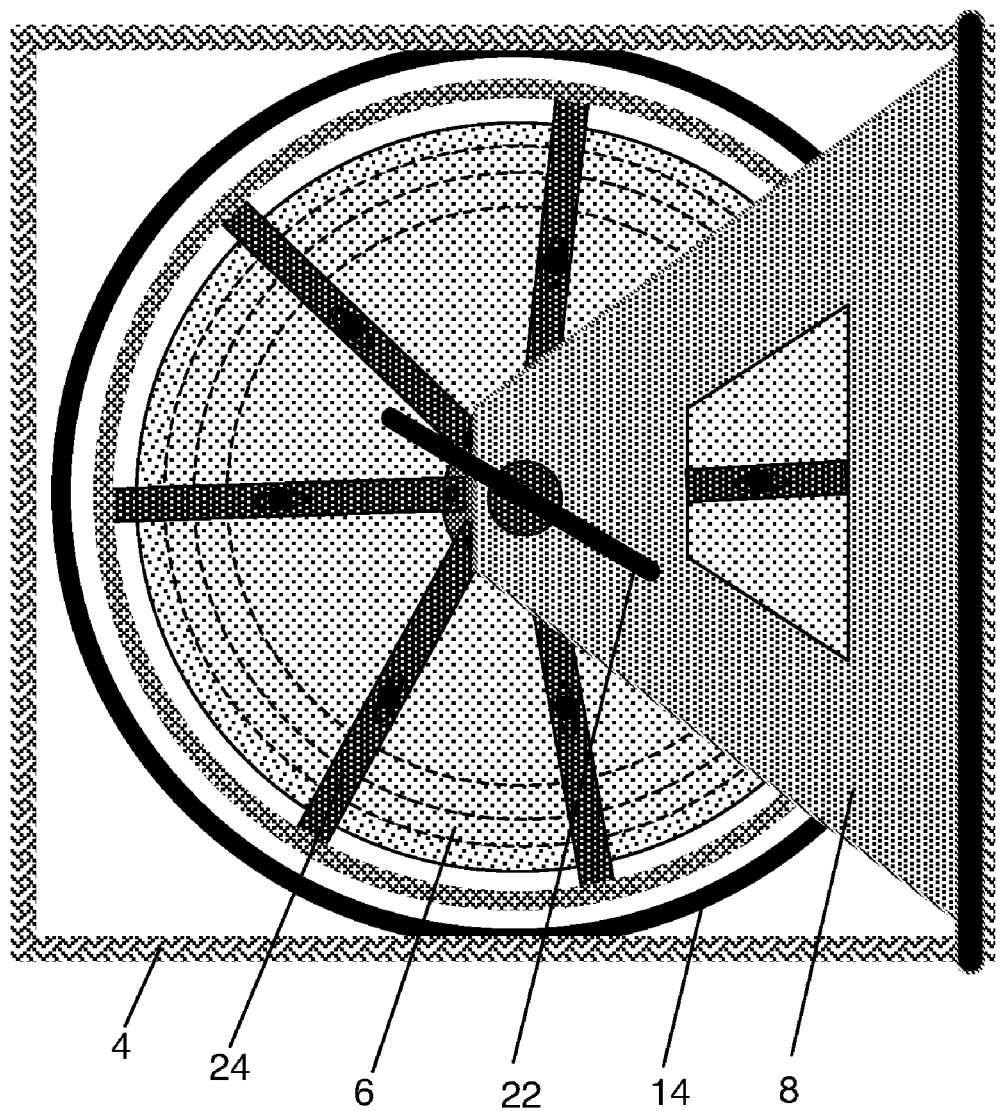
FIGS. 2A and 2B shows the details of the rotary drum and its sealing and locking drum door on a swing arm.
Figure 2B:
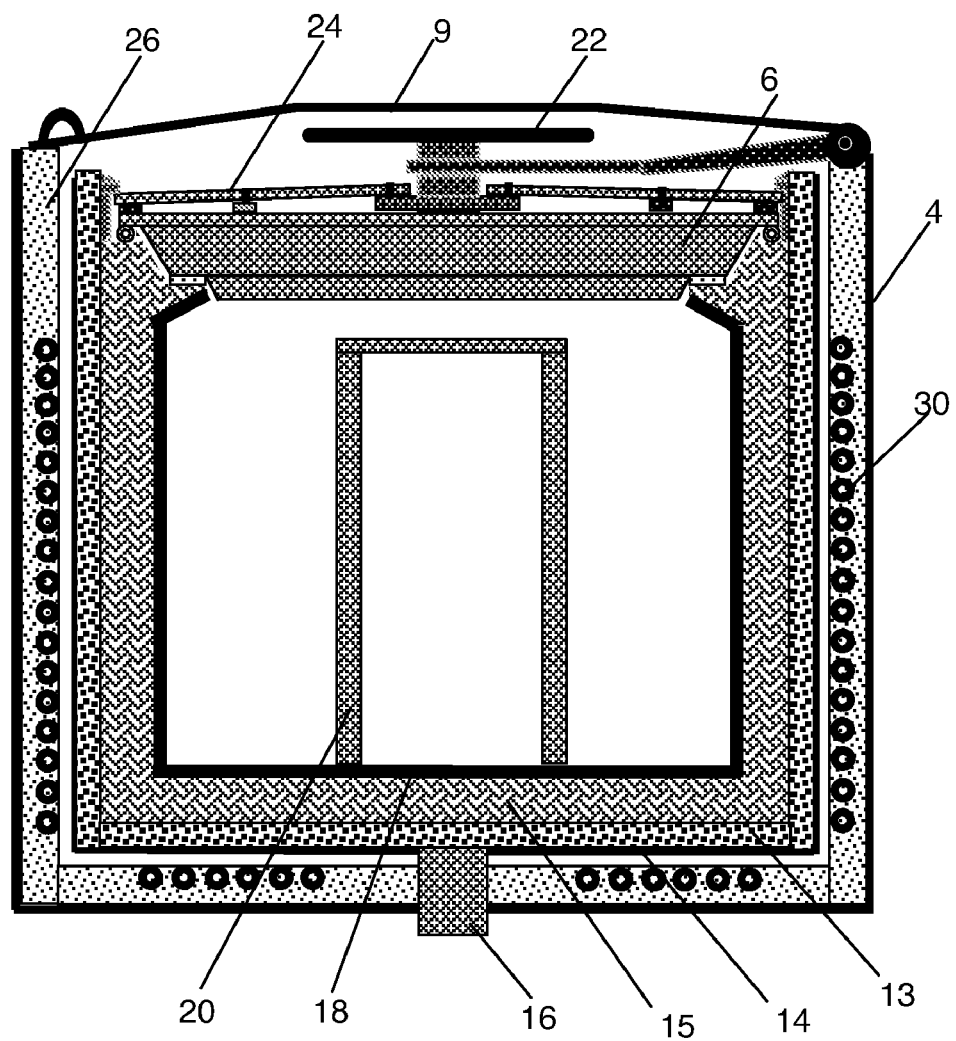

Referring to FIG. 2A, the locking and sealing drum door 6 mounted on swing arm 8 fits the main receptacle receiving the waste that consists of a rotary drum 14 that is well insulated on the inside. Referring to FIG. 2B there is shown a cross-section through drum 14 that is pivoted by rotary shaft 16. The inner wall of the drum 14 consists of a heavy wall alloy 18 as well as a central cylinder of even thicker alloy wall 20 to contain the highest temperature heat. This drum 14 rotates around a rotary shaft and seal 16 that excludes air and allows gases to pass through and is described in more detail in FIGS. 3 and 4. The drum door 6 has to rotate and seal at the same time, so that it is designed with a door handle 22 to operate the door locking mechanism 24 that consists of an array of bars which pivot and slide away from the drum top edge lip. When the handle 22 is rotated, these bars pivot off of a ramp releasing pressure on the drum and its seal so that it can be opened. There are pressure sensors that insure that drum 14 is closed, locked and pressure sealed before it is rotated and any heat is applied. Since handle 22 rotates through swing arm 8, it needs to be protected by an outer closing door 9 for safety reasons. The outer layer of rotating drum 14 is very well insulated by layers of insulation, 13 and 15, to insure good energy efficiency. The inner enclosure of module, 2, is also well insulated with conversion layer 26 to avoid burns from users of the appliance and to further achieve high energy efficiency. The outer wall also contains induction coils 30 for heating conductive susceptors 18 and 20.

Figure 3:
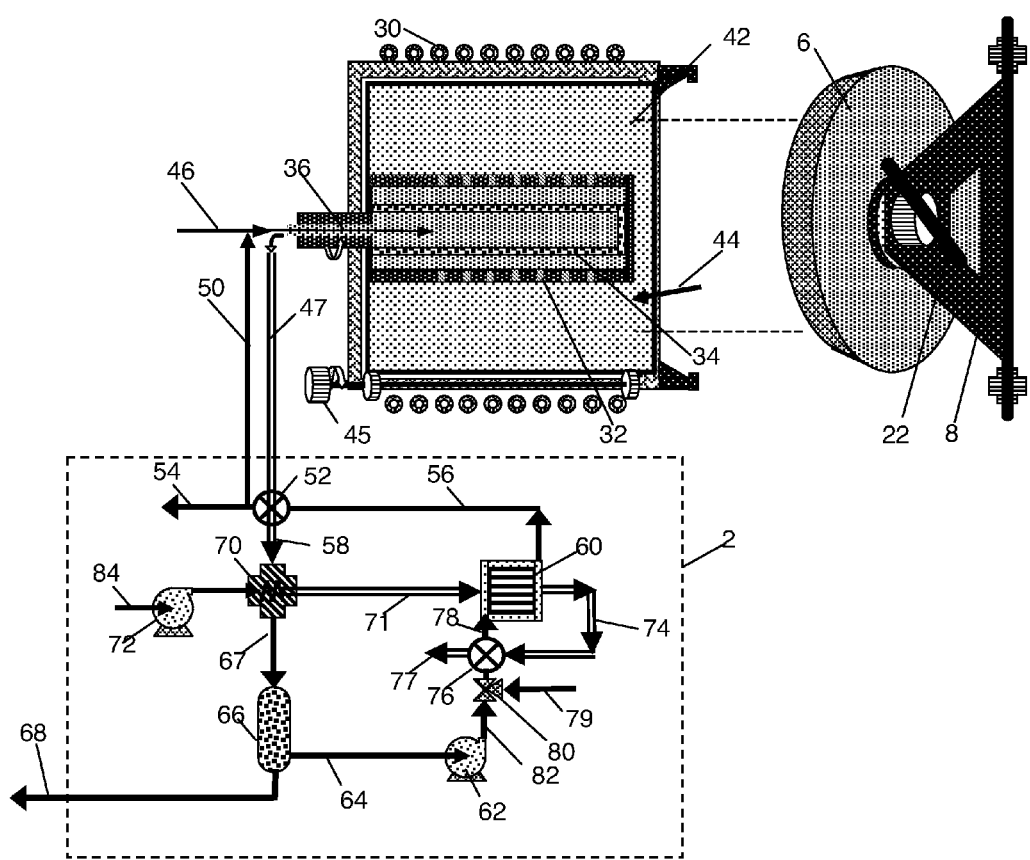
FIG. 3 shows a preferred embodiment of a rotary drum that is heated by induction coils, typically supplied by Inducto-Heat of New Jersey and others; and the process configuration downstream of the rotary drum where the syngas is used for production of electricity, steam and heat.

FIG. 3 shows one of the preferred embodiments of the present invention that uses a steam reforming means that includes an internal heater, which in this embodiment is in the form of induction coils 30 for heating the rotary drum 14 in which is placed the waste 44 and tube 32. This rotary drum heats the waste 44 to about 450-600° C. (840-1100° F.) and starts the steam reforming reactions. The waste volatiles and initially formed syngas are produced in a volume 42 inside rotary drum 14. When the steam reforming reactions within this drum volume 42 form syngas, these gases pass through the heated perforated central cylindrical tube 32 that is heated by the fixed induction heaters 30 around the outside of the enclosure. Within this central cylindrical tube 32 the syngas is heated to about 900-1050° C. (1650-1900° F.) and reacted with the steam and $CO_2$ to form very hot syngas exiting this central cylindrical tube 32 is syngas stream 47 at 800-950° C. (1470-1750° F.). Within perforated cylindrical tube 32 is a removable filter cartridge 34 which captures any entrained particulate matter to avoid carrying this fine material downstream in the process lines 47, through which the syngas so produced exits the rotary drum system that is rotated by motor system 45. A rotary process piping seal 36 is used to inject steam and carbon dioxide through pipe 46 and the synthesis gas so produced exits through pipe 47.

This very hot syngas 47 enters heat recuperator exchanger 52 that cools this syngas to 600-800° C. (1100-1450° F.) in pipe 58 with the cooler stream 56 at 550-750° C. (1020-1380° F.) containing $CO_2$ and steam. Air 84 is blown via blower 72 through heat exchanger 70 to supply heated air 71 to serve the cathode of the fuel cell. The cathode exhaust gas 74 comes from fuel cell 60. The fuel cell anode exhaust stream 56 can contain a small fraction of unconverted syngas, which can be recirculated back to the steam reformer drum volume 42 shown in cross-section for utilization. Part of this 800-950° C. (1470-1750° F.) exchanger exit stream 54 also is recirculated as stream 50 back into the cartridge steam reformer 32 to make more syngas. The gas 54 leaving heat exchanger 52 will be about 800-950° C. (1470-1750° F.) and can be used to drive a Brayton cycle turbine to make more electricity and use its exhaust to raise steam for sale, or stream 54 can be used for other useful purposes. One such purpose is to feed a commercial pressure swing absorber such as those manufactured and sold by Air Products, Quest Air, and others, for producing pressurized fuel-quality hydrogen for local storage and used to fuel vehicles.

The very warm syngas 58 leaves heat exchanger 52 at about 650-750° C. (1200-1380° F.) and enters heat exchanger 70, which can also be a second set of coils in exchanger 52. Cool outside air 84 is fed into this exchanger 70 by blower 72 to be heated to 570-670° C. (1050-1150° F.) as exit stream 71, which in-turn is the hot air feeding the fuel cell 60. The air stream is electrochemically reduced in the cathode to exit as nitrogen gas 74 at about 600-700° C. (1100-1300° F.) and is fed to exchanger 76 and exiting as 77 at about 130° C. (270° F.) to be used for other purposes, such as generating domestic hot water.

The cooled syngas 67 at about 150-200° C. (300-400° F.) passes into packed bed absorber 66 to clean the syngas of impurities containing chlorine and sulfur and other potential poisons to the fuel cell. A condensate stream 68 leaves this absorber 66 to go to sewer drain. The clean, cool syngas 64 is pulled from the absorber 66 at about 130° C. (270° F.) by blower 62 and feeds the exchanger 76 which raises the syngas temperature to 600-700° C. (1100-1300° F.) for feeding the anode side 78 of the fuel cell 60. Natural gas, propane, or other fuel source can be used in line 79 to start up fuel cell 60 and the system via mixing valve 80.

Figure 4:
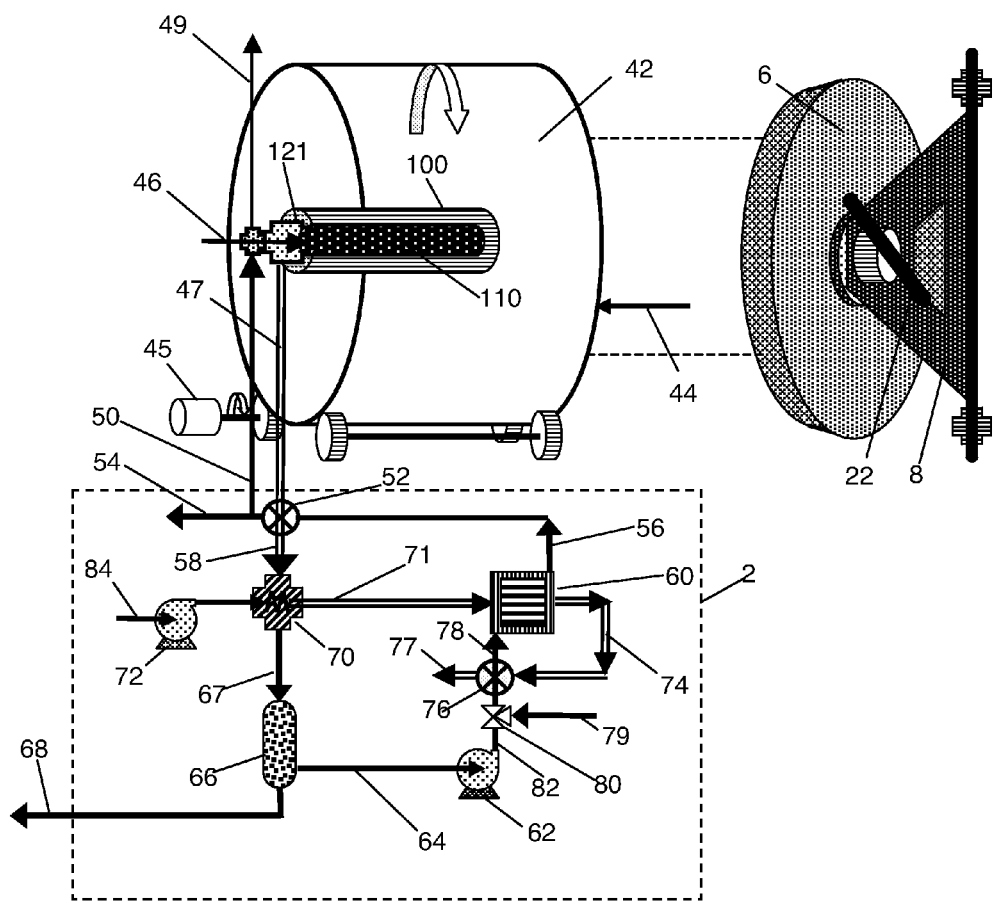
FIG. 4 shows a preferred embodiment of a rotary drum that is heated by natural gas matrix heater cartridge and the process configuration downstream of the rotary drum where the syngas is used for production of electricity, steam and heat.

Another preferred embodiment of the present invention is shown in FIG. 4, which involves heating volume 42 of the rotary drum 14 through combustion of natural gas. This embodiment has two disadvantages because it uses expensive natural gas and it involves the evolution of carbon dioxide. As shown in FIG. 4, drum 14 shown in isometric has internal volume 42. It has a manually operated means of handle 22 to lock the autoclave-type sealing door 6 that rotates with the drum. The waste 44 enters the rotary drum that is rotated by means of a motor drive system 45. Inside and co-centric to the rotary drum there is a stationary heated cartridge cylinder 100 through which the waste volatiles pass that is heated by an internal heater, which in this embodiment, is in the form of a matrix heater, 112 shown in FIG. 5 fed by a outside combustible gas fuel stream 46 venting to the outside through pipe 49. This rotary drum volume 42 heats the waste to about 700-900° C. (1300-1650° F.) and starts the steam reforming reactions. The waste volatiles and initially formed syngas produced inside this rotary drum are pulled into the inside of this cartridge wherein the organics are heated to about 900-1050° C. (1650-1900° F.) and reacted with the steam and $CO_2$ to form very hot syngas exiting this central cartridge as syngas stream 47 at 800-950° C. (1470-1750° F.)

This very hot syngas 47 enters heat recuperator exchanger 52 that cools this syngas to 650-750° C. (1200-1380° F.) in pipe 58 with the cooler stream 56 at 570-670° C. (1050-1150° F.) containing $CO_2$ and steam. The cathode exhaust gas 74 comes from fuel cell 60. The fuel cell anode exhaust stream 56 can contain a small fraction of unconverted syngas, which can be recirculated back to the steam reformer drum volume 42 for utilization. Part of this 700-900° C. (1300-1650°) exchanger exit stream 54 also is recirculated as stream 50 back into the cartridge steam reformer 100 to make more syngas. The gas 54 leaving heat exchanger 52 will be about 700-900° C. (1300-1650°) and can be used to drive a Brayton cycle turbine to make more electricity and use its exhaust to raise steam for sale, or stream 54 can be used for other useful purposes. One such purpose is to feed a commercial pressure swing absorber, such as those manufactured and sold by Air Products, Quest Air, and others for producing pressurized fuel-quality hydrogen for local storage and used to fuel vehicles.

The very warm syngas 58 leaves heat exchanger 52 at about 650-750° C. (1200-1380° F.) and enters heat exchanger 70, which can also be a second set of coils in exchanger 52. Cool outside air 84 is fed into this exchanger 70 by blower 72 to be heated to 570-670° C. (1050-1150° F.) as exit stream 71, which in turn is the hot air 71 feeding the fuel cell 60. The air stream is electrochemically reduced in the cathode to exit as nitrogen gas 74 at about 570-700° C. (1050-1300° F.) and is fed to exchanger 76 and exiting as 77 at about 130° C. (270° F.) to be used for other purposes, such as generating domestic hot water.

The cool syngas 67 at 80° C. passes into packed bed absorber 66 to clean the syngas of impurities containing chlorine and sulfur and other potential poisons to fuel cell 60. A condensate stream 68 leaves absorber 66 to go to sewer drain. The clean, cool syngas 64 is pulled from the absorber 66 at about 130° C. (270° F.) by blower 62 and feeds via 82 the exchanger 76 which raises the syngas temperature to 600-700° C. (1100-1300° F.) for feeding the anode side 78 of fuel cell 60. Natural gas, propane, or other fuel source can be used in line 79 to start up fuel cell 60 and the system via mixing valve 80.

Figure 5:
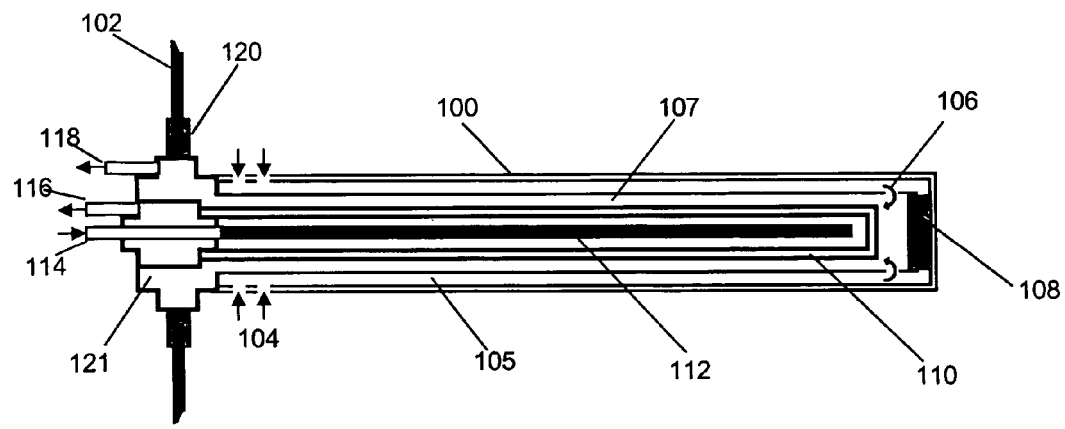
FIG. 5 shows the details of this natural gas matrix heater cartridge, typically supplied by the Hauck Burner Corp., Baekert, Gmbh, and others.

The details of the steam reforming cartridge 100 are shown in FIG. 5. The cartridge is inside the end of the rotary drum wall 102 and remains fixed while the drum rotates and remains sealed by rotary seal 120. The hot waste volatiles and partially formed syngas are pulled in through ports 104. This gas is heated while it travels along the outer annulus 105 of the cartridge and turns around at the end of the annulus 106 to travel along the hotter inner annulus 107 and exiting at port 118. The annulus tube assembly is kept centered by a plug insulator 108 at the right end of the annulus tube. The center of the cartridge inside tube 110 is heated by burning a combustible gas 114 in the matrix heater 112 that radiates heat out to the surrounding annuli 105 and 107. The combustion products of this matrix gas burning leave at port 116. Alternately this central heater could also be supplying heat by electrical resistance heaters, induction heaters, or other means of generating heat.

EXAMPLE

The first step in the reduction to practice of the appliance of the subject invention was to conduct experimental, small-scale pilot tests to reveal the identity and nature of the syngas produced. Accordingly, just completed was a gas test using the Bear Creek Pilot plant where solid waste was steam/$CO_2$ reformed to make syngas. The syngas composition is shown in Table 1 below.

TABLE 1

| | | | |
|---|---|---|---|
| $H_2$ | Hydrogen | 62.71 | Vol % |
| CO | Carbon Monoxide | 18.57 | |
| $CO_2$ | Carbon Dioxide | 10.67 | |
| $CH_4$ | Methane | 7.58 | |
| $C_2H_6$ | Ethane | 0.48 | |
| $C_3$ TO $C_6$ | Propane through hexane | <0.01 | |
| $C_6H_6$ | Benzene | <17 | ppm |
| COS | Carbonyl Sulfide | 4 | ppm |
| $CS_2$ | Carbon Disulfide | 0.05 | ppm |
| $H_2S$ | Hydrogen Sulfide | <5 | ppm |
| $C_{10}H_8$ | Naphthalene | 2.6 | ppb |
| $C_{10}H_7CH_3$ | 2-Methylnaphthalene | ~0.6 | ppb |
| $C_{12}H_8$ | Acenaphthalene | ~0.4 | ppb |
| $C_{12}H_8O$ | Dibenzofuran | 0.36 | ppb |
| PCDF + PCDD | Polychlorinated-dibenzo-furans + Dioxins | 0.0041 | ppt TEQ |

What has been found was that the syngas was very rich in hydrogen and carbon monoxide—most suitable for a variety of high temperature fuel cells (such as molten carbonate, solid oxide, and similar fuel cells.). And the minor contaminants, such as carbonyl sulfide, hydrogen sulfide, carbon disulfide, hydrogen chloride, and polychlorinated organics were identified and a removal system specified.

The pilot process configuration used to conduct these tests was published, see reference (1) below, and was used as the basis for improvements shown in FIG. 3. The standard, common-knowledge process train was configured for cleaning the syngas: Standard chilled caustic scrubber, demister mat, carbon bed and HEPA filter, after which the product syngas was subjected to a very exhaustive chemical analyses. Three parallel gas-sampling trains were used: Gas-Chromatography, GC-MS for volatile hydrocarbons, semi-volatile hydrocarbons, chlorine-containing and sulfur-containing compounds.

The standard scrubber widely used in industry for gas clean-up removed hydrogen sulfide and hydrogen chloride, but not carbonyl sulfide, carbon disulfide, or polychlorinated organics. It was found that these compounds penetrated right through this syngas standard clean-up process train and that these compounds would be poisons to a molten carbonate or solid oxide high temperature fuel cell by the mechanism of chlorine or sulfur poisoning. So this important information was used to design the syngas clean-up system that would handle all these contaminants.

Volatile heavy metals can also poison the fuel cell and the collected solids in the scrubber were analyzed for such heavy metals and they were mostly removed. Highly volatile heavy metals, such as mercury or heavy metal chlorides or fluorides would be removed in the future clean-up system.

The scrubbed syngas was next fed to a room temperature demister mat, onto which a steadily increasing deposit of fine soot-like particles occurred. The pressure drop across this demister during the run was determined and found it to show a steady, linear increase in pressure drop as the deposit layer built up on the upstream face. These deposits were not analyzed. The downstream side of this demister filter remained clean and white throughout the entire run. Deposits appear to be soot with a slight odor of naphthalene.

The syngas leaving the demister was next fed into a granular activated carbon bed, which was designed to capture the volatile organics and volatile heavy metals that reached this point. The carbon bed was found to remove a great amount of these minor constituents and quickly became saturated throughout its entire length and broke through about 2 hours into the 3 hour solid waste feed period. The carbon load is believed to be mostly benzene and low molecular weight volatile chloro-organics.

The final step in the syngas cleanup was the HEPA filter, which worked very well during the whole run, not showing any build up in pressure from entrained fines or humidity; however, there was a substantial amount of volatile heavier hydrocarbons and sulfur- and chlorine-containing hydrocarbons that got through: benzene<16 ppm, naphthalene=2.6 ppb, methylnaphthalene=0.6 ppb, acenaphthalene=0.4 ppb, and non-chlorinated dibenzofuran=0.36 ppb, polychlorinated dibenzodioxin and dibenzofuran TEQ=0.0041 ppt, COS=4 ppm, and $CS_2$=0.05 ppm. $H_2S$ was below level of detection so the chilled scrubber did well on $H_2S$, as well as HCl.

The very small, but still detectable polychlorinated dibenzodioxin and dibenzofurans were probably formed at the cooler end of the process train, since they are not formed during the steam reforming process. Their formation was probably before the quenching portions of the scrubber. Thus, the industry-standard scrubber approach alone is not sufficient for making syngas of high enough quality for fuel cells but the new syngas clean-up system does this.

The pilot tests showed that very high hydrogen content syngas can be produced using the steam/$CO_2$ reforming chemistry with a typical feed-stream of household waste.

Reference: (1) T. R. Galloway, F. H. Schwartz and J. Waidl, "Hydrogen from Steam/$CO_2$ Reforming of Waste," Nat'l Hydrogen Assoc., Annual Hydrogen Conference 2006, Long Beach, Calif. Mar. 12-16, 2006.

What is claimed is:

1. An appliance comprising:
   a) a waste receptor module having:
      i) a rotary drum having an opening for receiving household waste and heated from room temperature to about 450-600° C. (840-1100° F.) wherein a substantial amount of the household waste is volatilized to organic waste, a swing arm attached adjacent to the opening in said rotary drum, and a sealing door mounted on said swing arm for sealing the opening when the waste receptor module is in operation, said sealing door having a locking mechanism and a handle for setting the locking mechanism in a locked position,
      ii) steam reforming means for converting at least the substantial amount of the household waste into synthesis gas that includes a perforated tube mounted within the rotary drum for receiving the volatilized organic waste produced in the rotary drum and an internal heater for heating the organic waste in the range from about 900-1050° C. (1650-1900° F.; and
      iii) an outer door to cover said sealing door and said handle; and
   b) an energy generation module having:
      i) an inlet in fluid communication with said waste receptor module for receiving the synthesis gas; and
      ii) a fuel cell for converting the synthesis gas into at least electrical energy.

2. The appliance of claim 1, wherein a pipe is located between said waste receptor module and said energy generation module for returning unreacted synthesis gas, steam and carbon dioxide from said energy generation module to said waste receptor module.

3. The appliance of claim 2, wherein said locking mechanism has an array of bars which pivot and slide away from said rotary drum when said handle is rotated to release pressure on said rotary drum and to allow the opening of said sealing door.

4. The appliance of claim 3, wherein said rotary drum is heated by coils on the exterior walls of said rotary drum within said waste receptor module.

5. The appliance of claim 4, wherein a removable filter cartridge is mounted within the perforated tube.

6. The appliance of claim 5, wherein a rotary process piping seal is used to inject steam and carbon dioxide into said steam reforming means.

7. The appliance of claim 6, wherein the synthesis gas entering said energy generation module through said inlet is passed through a heat recuperator exchanger for cooling the synthesis gas to temperatures in the range of about 650-750.degree. C. (1200-1400) by means of a returning cooler stream passing through said pipe containing unreacted synthesis gas, carbon dioxide and steam.

8. The appliance of claim 7, wherein said fuel cell includes an anode side and a cathode side and wherein the synthesis gas is fed to the anode side.

9. The appliance of claim 8, wherein said energy generation module includes a blower for feeding air through a heat exchanger into the cathode side of said fuel cell.

10. The appliance of claim 9, wherein at least a portion of the unreacted synthesis gas, steam and carbon dioxide passed from the anode side of the said fuel cell through a second pipe to said waste receptor module.

11. The appliance of claim 10, wherein after said steam reforming reactions take place in said waste receptor module, the waste receptor module is cooled, said outer door and said sealing door are opened, and any unconverted waste in the form of glass, metals, and other unconverted waste is discarded.

12. The appliance of claim 11, wherein said heat exchanger in said energy generation module heats the incoming air to said fuel cell with the hot synthesis gas from said heat recuperator exchanger.

13. The appliance of claim 12, wherein said energy generation module includes a second heat exchanger that exchanges the heat from a hot nitrogen stream leaving the cathode side of the said fuel cell which further cools said hot synthesis gas from said first heat exchanger.

14. The appliance of claim 13, wherein said energy generation module includes a bed absorber to clean the synthesis gas from said first heat exchanger to remove impurities prior to being fed to the anode side of said fuel cell.

15. The appliance of claim 14, wherein the hot nitrogen stream from the cathode side of said fuel cell is used to provide space heating or cooling.

16. The appliance of claim 15, wherein the steam that is condensed in said bed absorber is removed from said energy generation module.

17. The appliance of claim 16, wherein a portion of the exhaust stream from the anode side of said fuel cell can be recirculated back to said perforated tube.

18. The appliance of claim 17, wherein the portion of said exhaust stream from the anode side of said fuel cell is used to drive a Brayton cycle turbine for the production of additional electrical energy.

19. The appliance of claim 18, wherein said remaining gases from the anode side of said fuel cell can be used to feed a commercial pressure swing absorber for the production of high-quality hydrogen.

20. The appliance of claim 19, wherein said rotary drum rotates around a rotary shaft and seal connected to the exterior of said rotary drum.

* * * * *